United States Patent Office 3,374,122
Patented Mar. 19, 1968

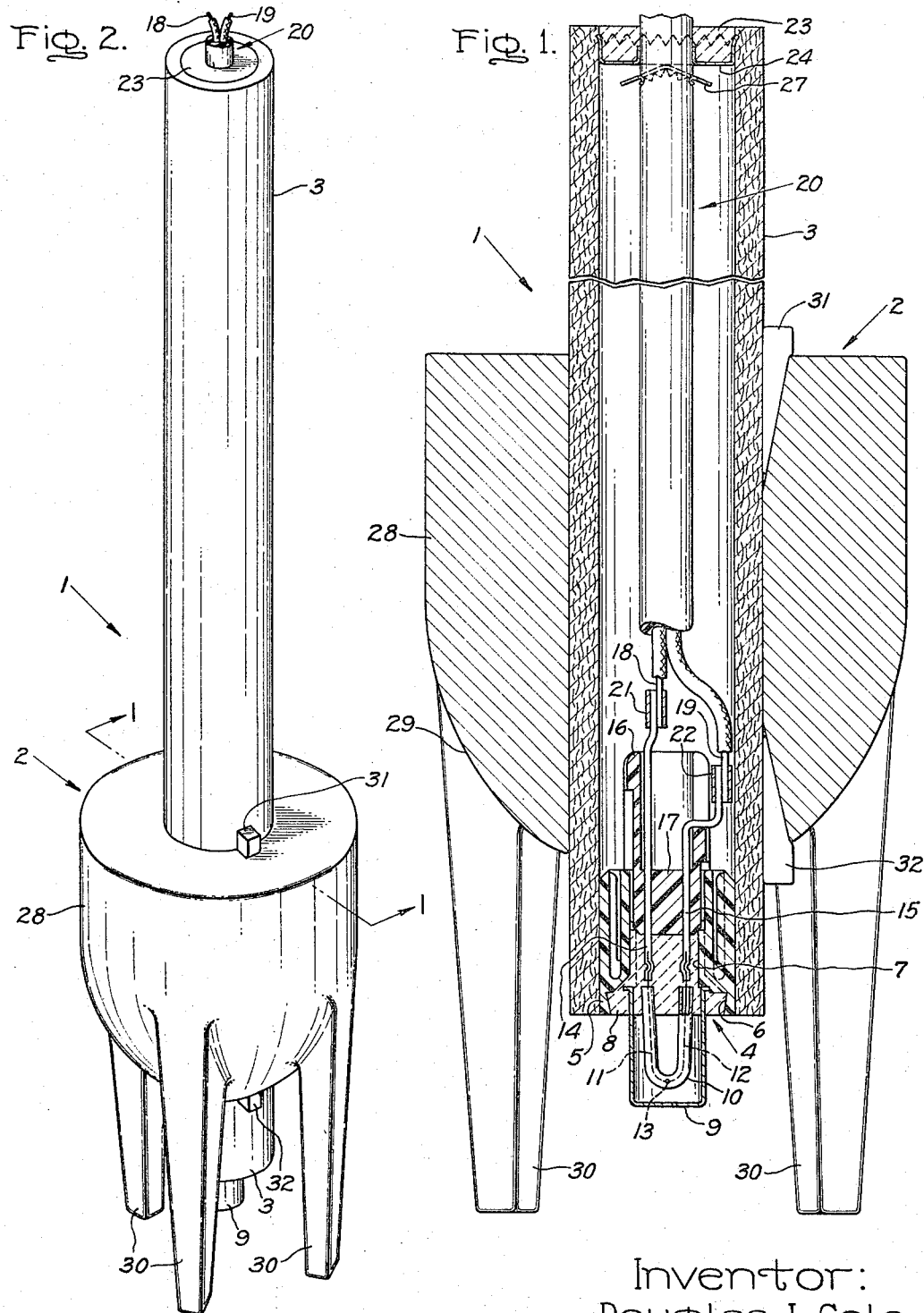

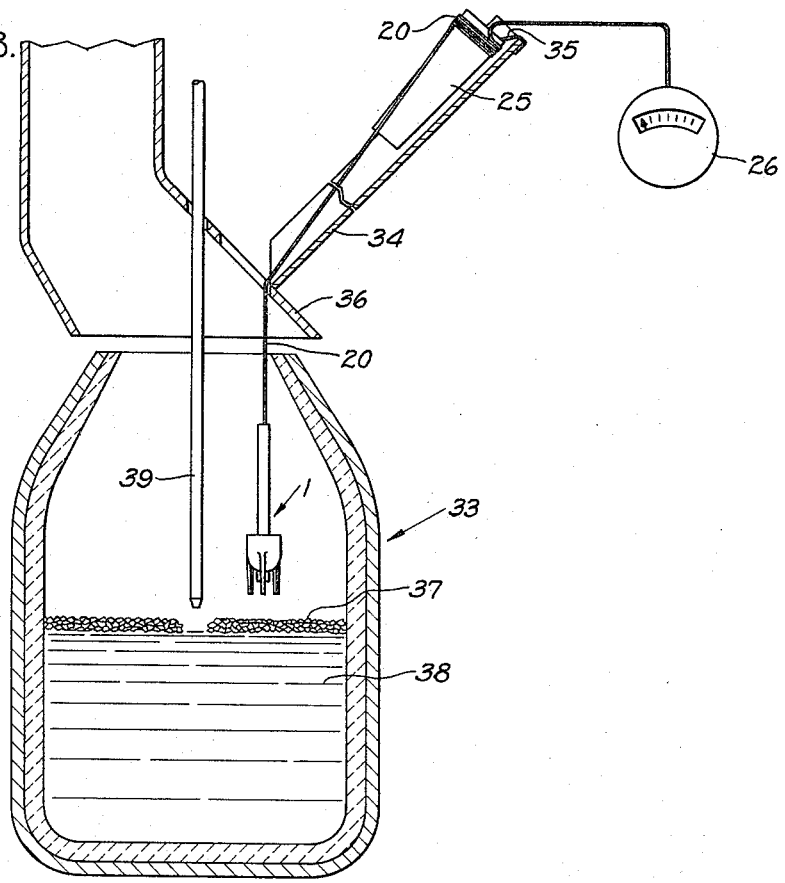

3,374,122
EXPENDABLE IMMERSION THERMOCOUPLE INCLUDING WEIGHT
Douglas I. Cole, East Cleveland, Ohio, assignor to General Electric Company, a corporation of New York
Filed Dec. 24, 1964, Ser. No. 421,016
5 Claims. (Cl. 136—234)

The present invention relates to immersion pyrometers of the type including an expendable temperature sensing unit incorporating a thermocouple.

In application Ser. No. 337,232, filed Jan. 13, 1964, now Patent No. 3,246,520, assigned to the assignee of the present application and in which Alfred T. Gaskill and Roland E. Clark along with the present applicant are named as inventors, a thermocouple assembly for a unit of this type is disclosed and claimed. The unit includes a heat insulating sleeve and a thermocouple assembly mounted in and closing the immersion end of the sleeve. The sleeve is adapted to slip over and make a frictional fit with a manipulator or lance in the form of an elongated metal pipe. The end of the pipe carries a receptacle provided with electrical contacts and the thermocouple assembly is adapted to plug into the receptacle and make electrical connection with the contacts thereof. In use, the thermocouple assembly is immersed in the bath of molten metal for sensing the temperature of the bath and is withdrawn from the bath after the temperature has been measured and recorded by suitable apparatus electrically connected to the contacts of the receptacle. The thermocouple unit is removed from the manipulator after one temperature measurement has been made and is discarded to be replaced by an unused unit on the manipulator in making a subsequent temperature measurement.

Expendable thermocouple units of this type are eminently satisfactory for taking a temperature measurement of molten metal in an open hearth type of furnace and many thousands of such units have been used in connection with the production of steel in furnaces of this type. Such furnaces provide access to the bath of molten metal so that the lance carrying the thermocouple unit may be inserted into the furnace a sufficient distance to immerse the thermocouple assembly in the bath.

Such ready access to the bath of molten metal is not provided in furnaces utilized for carrying out the basic oxygen process for making steel. Such furnaces are tiltable vessels of substantial depth and are supported in an upright position while the steel-making process is being carried out. A hood is disposed over the open top or mouth of the furnace in the upright position of the latter for conveying fumes and smoke to a stack. An oxygen conveying lance extends through an opening in the wall of the hood into the furnace and terminates in the steel bath or immediately above the slag layer floating on the bath of molten metal partially filling the furnace. In order to utilize the thermocouple units of the type described above for sensing the temperature of the bath of molten metal in such furnaces it has been necessary to remove the oxygen lance from the furnace and tilt the furnace to shift its mouth from beneath the hood in order to thrust a thermocouple unit mounted on a lance through the mouth of the furnace and immerse the thermocouple assembly in the bath of molten metal. Thereafter the furnace is usually returned to an upright position and the process continued. This has proven to be an impractical maneuver for many reasons including interruption of the steel-making process which adds considerably to the cost of manufacture of the steel.

Frequently the hood for the furnace is provided with a chute leading into the furnace for introducing additional material into the melt if needed during the steel-making process. The chute provides access to the interior of the furnace but since the level of the molten steel bath varies between 10 to 30 feet below the open top of the furnace when the latter is in an upright position and the chute is mounted at an angle to the furnace axis, the thermocouple units of the above type cannot be used to make a temperature measurement through the chute opening because it is impossible to immerse the thermocouple assembly of the unit in the bath of the molten steel with the furnace in this position.

It has been proposed heretofore to dispense with the lance and the sleeve of the commercially available equipment and to provide an iron weight accommodating a commercial thermocouple assembly for carrying the assembly into the bath with the thermocouple element protruding from the weight for sensing the temperature of the molten metal of the bath. An extension cord including mutually insulated conductors is electrically connected at one end to lead wires which in turn are connected to the thermocouple element of the assembly and the cord is adapted at its opposite end for connection with temperature measuring and recording apparatus. The weighted thermocouple assembly with the cord so connected is dropped through an opening in the hood into the upright furnace to fall freely onto and sink in the bath of molten metal.

Attempts to use such weighted thermocouple assemblies for sensing the temperature of the molten metal bath in the above manner have not met with success to applicant's knowledge because either no temperature measurement has been obtained or if one was obtained it was inaccurate. The cause of the difficulty with prior weighted thermocouple assemblies is not readily determined because the assembly together with part of the extension cord is quickly consumed in the furnace and the iron weight is melted in the bath.

It may be assumed, however, that since the temperature sensing thermocouple element projects beyond the weight it is probably made inoperative on contact with the bath if the weighted assembly falls on the surface of the slag covered bath with the thermocouple element foremost. This is possible even though the projecting thermocouple element of the assembly is encased in a fused quartz U-shaped tube which in turn is enclosed by a thin wall fusible metal cap projecting beyond the weight since the tube and the cap are frangible. Further, the inaccuracy of the temperature measurement where one is obtained may be due to a tumbling action of the weighted thermocouple assembly as it sinks into the bath inasmuch as no provision is made for guiding the assembly with the thermocouple element forwardmost as it sinks.

The principal object of the present invention is to provide apparatus including an expendable immersion thermocouple unit of the above type for sensing the temperature of molten metal in a bath contained in an open top tiltable furnace for the basic oxygen steel-making process without interrupting the process and without tilting the furnace.

Another object of the invention is to provide an expendable immersion thermocouple unit for such apparatus.

Further objects and advantages of the invention will appear from the following detailed description of a species thereof, from the accompanying drawings and the appended claims.

In the drawings:

FIG. 1 is a longitudinal sectional view, taken along the line 1—1 of FIG. 2 in the direction of the arrows, of an expendable immersion thermocouple unit embodying the invention;

FIG. 2 is a perspective view of the unit shown in FIG. 1; and

FIG. 3 is a longitudinal sectional view of a basic oxygen steel-making furnace and the hood for the furnace and showing also in elevation the oxygen lance and the apparatus including the expendable immersion thermocouple unit of FIGS. 1 and 2.

Referring to FIGS. 1 and 2 of the drawings, the expendable immersion thermocouple unit 1 of the present invention includes a metal weight 2, a stiff tube 3 of heat-insulating material, such as paper or fiberboard, or the like, and a thermocouple assembly 4 mounted in and closing one end of the tube 3 against the entrance of molten metal. The sleeve 3 which is suitably about 18 inches in length and 1½ inches in outer diameter with a wall thickness of about ¼ inch, protects the parts of the thermocouple assembly 4 mounted therein from excessive heat when the thermocouple unit 1 is immersed in a molten metal bath in taking a temperature measurement.

The thermocouple assembly 4 is of the type disclosed and claimed in the above-identified copending application to which reference is made herein for a complete description of the assembly. In brief, the assembly 4 includes a generally tubular body member 5 or organic plastic electrically insulating molding material having longitudinally aligned bores 6 and 7. The foremost bore 6 of the body member is tapered, is of larger diameter than the rearmost bore 7 and is filled with a solid unitary body 8 of electrically and heat-insulating refractory cement which extends into the rearmost bore a substantial distance. The thermocouple assembly 4 also includes a protective, flared rim, fusible metal cap 9 projecting forwardly of the body member 5, a fused silica U-shaped heat-transmitting tube 10 mounted within the cap with its curved portion foremost for exposure on melting of the cap, thermocouple wires 11 and 12 joined together and forming a heat-sensing junction 13 within the curved portion of the tube 10 exposed on melting of the cap, a pair of spaced-apart current lead wires 14 and 15 crimped at one end to the ends of thermocouple wires 11 and 12, respectively, outside the tube 10. As shown in FIG. 1, the flared rim of the cap 9, the ends of the U-shaped tube 10 and the junctions between the lead wires 14, 15 and the thermocouple wires 11, 12 are embedded in the unitary refractory cement body 8 which secures the above components of the assembly 4 together.

In a specific embodiment of the invention, the thermocouple wire 11 consisted of platinum and the lead wire 14 consisted of an alloy of copper and 2% nickel; the thermocouple wire 12 consisted of platinum with 10% rhodium and the lead wire 15 of copper to avoid the introduction of extraneous E.M.F.'s into the measuring circuit.

The assembly 4 also includes a molded, organic plastic plug member 16 extending into the rearmost bore 7 and providing at its inner end 17 a pair of spaced-apart passages for the lead wires 14 and 15. In the thermocouple unit of the present invention the lead wires 14 and 15 are connected at their ends emerging from the plug 16 to the ends of the mutually insulated conductors 18 and 19, respectively, of the extension cord 20 by the clamp connectors 21 and 22, respectively. The cord 20 extends along the tube 3 from the end of the tube opposite the end thereof accommodating assembly 4. The space between the said tube end and the cord is closed by an annular body 23 of cement similar to that of cement body 8; the two cement bodies being effective for sealing the interior of the tube 3 from the entrance of molten material thereinto. An annular metal cup 24 having a flared serrated rim biting into the inner surface of tube 3 supports the cement body 23.

The extension cord 20 is wound on a hollow cone-shaped stiff support 25 (FIG. 3) of fiberboard, or the like, and the free end thereof is provided with an electrical plug (not shown) for insertion into a receptacle having contacts connected with a temperature recording apparatus 26 of conventional structure.

The expendable immersion thermocouple unit shown in FIGS. 1 and 2 also includes the weight 2 of a particular shape effective for facilitating the entrance of the unit into the bath of molten steel while protecting the parts of the thermocouple assembly 4 against breakage while passing through the layer of slag usually covering the surface of the molten steel bath.

To avoid the risk of disruption of the electrical connections described above in handling and in use of the weighted unit, a bent ring 27 butting against the bottom of cup 24 and having a serrated inner periphery biting into the insulation covering of cord 20 is provided to resist any forces tending to pull cord 20 out of tube 3. Thus, if the unit 1 is inadvertently lifted by the cord 20 with the weight 2 attached to the tube 3 the force tending to pull the cord out of the tube is resisted by the ring 27, the cup 24 and the tube 3.

The weight 2 has a tubular main portion 28 having a bore of sufficient size to accommodate the paper tube 3 and a cylindrical outer surface terminating in a rounded foremost end 29 from which extend lengthwise of the weight three elongated tapered prongs 30. The weight 2 and the tube 3 are securely fastened together by wood wedges 31 and 32 inserted in slots in the wall of the bore of the weight and which firmly engage both the tube 3 and the weight 2. An iron weight of about ten pounds has been found effective for the purpose.

As shown in the drawings, the tube 3 and the weight 2 are fastened together in such manner that the end portion of the tube 3 around the body member 5 of the thermocouple assembly 4 extends outwardly beyond the rounded end 29 of the weight. The temperature sensing junction 13 of the thermocouple wires 11 and 12 protruding from the thermocouple assembly 4 thus is supported a substantial distance from the part 28 of the weight which minimizes or completely eliminates the effect on the thermocouple junction 13 of absorption by that part of the weight of heat from the molten metal of the bath in the use of the apparatus in the manner described below. Further, the prongs 30 of the weight 2, which terminate outwardly beyond the junction 13, are spaced laterally from the junction 13 a distance such that the heat absorption of the prongs does not influence the junction 13 in use of the apparatus.

In use of the apparatus for taking temperature measurements in connection with a basic refractory lined steel shell furnace 33 of the basic oxygen type shown in FIG. 3, the immersion thermocouple unit 1 is placed on the chute 34 weight end foremost, the cone-shaped support 25 with the extension cord 20 wound thereon is mounted in fixed position on bracket 35 with its smaller diameter end toward the chute, and the free end of the extension cord is electrically connected to the temperature measuring and recording apparatus 26.

The operator then pushes the unit 1 slowly down the chute 34 until it drops from the chute and falls through the hood 36 into the furnace 33. As the unit falls under its own weight toward the slag layer 37 floating on the bath 38 of molten metal in the furnace, the extension cord is pulled off the cone-shaped support and dragged along the surface of the chute. The small force required is to so move the extension cord tends to retard the fall of the unit to a degree sufficient only to maintain it in a vertical position weighted end down, as shown in FIG. 3, without substantially diminishing the considerable force with which the unit strikes the slag layer to penetrate the layer and plunge into the bath of molten metal.

Since the layer of slag on the bath may be three to fifteen inches thick and, particularly during the starting period of the basic oxygen process, may be crusty, it is necessary to use a weight of sufficient size and of a shape effective for breaikng through the layer of slag. It is necessary also to protect the thermocouple element 11, 12 from damage by the impact of the thermocouple unit on the slag layer. Inasmuch as the thermocouple unit may fall through a distance of ten to thirty feet before it hits the slag layer, it is obvious that the risk of damage to the thermocouple element is considerable.

As the thermocouple assembly described above hits the slag layer 37 the prongs 30 of the weight 27 first penetrate into the layer to break the crust. With the crust of the slag layer broken the rounded end 29 of the weight 2 facilitates the passage of the entire unit 1 through the layer of slag into the molten metal of the bath in which it sinks.

The part of the tube 3 extending upwardly from the weight 2 as the unit 1 falls serves as a rudder to guide the unit in a vertical position as it plunges into the molten metal bath. The tube 3, due to is buoyancy, also slows the descent of the unit in the bath.

These are essential features of the invention providing accurate temperature measurements of the molten steel bath with consistency.

As the unit descends in the bath, the fusible cap 9 melts to fully expose the quartz tube 10 enclosing the temperature sensing junction 13 between the thermocouple wires 11 and 12 to the heat of the molten steel in the bath 38. As the descent of the unit in the bath continues, the thermocouple junction 13 is subjected to the heat of molten steel which flows directly over the quartz tube 10 without first flowing over either the prongs 30 of the weight 2 or the part 28 of the weight. If the unit descended in the bath with the part 28 of the weight or one of the prongs 30 directly in front of the quartz tube 10 in the direction of descent, the heat absorbed by these parts of the weight would lower the temperature of the steel flowing over the quartz tube 10 resulting in an inaccurate measurement of the temperature of the bath.

As a result of the buoyancy of the paper tube 3, the descent of the unit in the bath is slowed so that the temperature measurement may be made in a horizontal zone at the proper level in the bath. By increasing the length or the overall size of the tube 3 to increase the buoyancy thereof, it is possible to select the horizontal zone of the bath in which the temperature reading is desired.

While the entire unit and part of the cord 20 are consumed in the furnace both the unit and the cord remain intact for so long a time, three to six seconds, as is required to take a temperature measurement of the molten steel bath.

The cylindrical outer surface of the part 28 of the weight 2 engages the surface of the chute 34 along two lines of contact when the chute is V-shaped in cross section and along a single line of contact when the chute is arcuate in cross section and of lower degree of curvature than the said weight surface. This minimizes the force required to move the unit down the chute. Further, the length of the part 28 of the weight is sufficient to support the unit in fixed position with relation to the surface of the chute along which it is pushed, that is, the unit does not tilt with respect to the said chute surface. The unit thus may be dropped from the chute accurately into a predetermined location in the bath 38 with respect to the oxygen lance 39. In view of the turbulence produced in the bath by the oxygen projected from the lower end of the lance, this is advantageous in obtaining a series of accurate temperature measurements of the bath because the temperature sensing junction of the thermocouple element of each of a plurality of units dropped into the bath at time intervals is subjected to the conditions existing in the same region of the furnace as each measurement is made.

The apparatus is readily assembled by first coiling the cord 20 around the support 25 leaving a substantial end length of the cord 3 free of the support. The free length of the cord is then threaded first through the cup 24, then the ring 27 and then through the tube 3. The ring 27 is crimped to the cord by bending the ring along its diameter before the cord is threaded through the tube 3. The ring 27 is fastened to the cord at a measured distance from the free end of the cord such that the bend in the ring engages the bottom of the cup within the tube 3 in the completed unit.

The current lead wires 14 and 15 of the assembly 4 are then connected outside the tube 3 to the exposed ends of conductors 18 and 19, respectively, by the clamp connectors 21 and 22, respectively, with the ends of the conductors and the wire overlapping as shown in FIG. 1. After these connections have been made the thermocouple assembly 4 is thrust into the end of the tube with which it makes a tight frictional fit and the cord 20 carrying the ring 27 is moved back along the tube 3.

The cup 24 is then inserted in the opposite end of the tube 3 a sufficient distance to engage and move the bent ring 27 along the tube 3 a slight distance so that the portion of the cord within the tube 3 and extending between the ring 27 and the assembly 4 is slack. A slight outward tug on the exposed cord longitudinally of the tube 3 is effective for setting the flared serrated rims of the cup into the inner surface of the tube without placing a strain on the electrical connections of the unit.

With the unit 1 mounted in the upright position shown in FIGS. 1 and 2, the cement in the form of a viscous liquid is poured into the tube 3 until it fills the cup and closes the upper end of the tube. The cement is then cured to form the solid, refractory heat-insulating body 23 to complete the assembling of the unit.

The weight 2 and the tube 3 are then placed in the relative positions shown in the drawings and described above and the wedges 31 and 32 are driven home in the wedge accommodating slots in the weight to fasten the tube and the weight together.

For convenience in shipping and storing the apparatus, the cone-shaped support 25 is made of such size that the unit 1 and the support may be in telescopic relation with the end of larger diameter of the support around the weight 2.

Preferably the conductors 18 and 19 of the cord 20 consist of stranded wires of the same composition as the lead wires 14 and 15 to which they are electrically connected, that is, the conductor 18 connected to wire 14 of the specific embodiment disclosed above preferably consists of an alloy of copper and 2% nickel and the conductor 19 connected to wire 15 of copper. However, when the electrical connections between the conductors and the lead wires are at a temperature not substantially higher than 40° F., and preferably about 32° F., when the thermocouple unit is introduced into the furnace, both conductors 18 and 19 and, when desired, both lead wires 14 and 15, may consist of copper. Of course, when the connections between the conductors and the lead wires are at such temperature, the connections between the thermocouple wires and the lead wires are at the same low temperature.

With such temperatures existing at these connections the copper conductors or copper lead wires do not introduce extraneous E.M.F.'s into the measuring circuit. The thermal insulation provided by the tube 3 and the parts of the thermocouple assembly 4 around the electrical connections described above is effective for preventing an appreciable rise in temperature at said connections during the time required to make a temperature measurement of the bath of molten steel in the furnace.

The bodies 8 and 23 of the thermocouple unit 1 preferably consist of "Sauereisen" cement which is a high alumina cement mixed as powder in sodium silicate. Other suitable refractory cements may be used. When desired, bonding adhesive, such as sodium silicate, is provided between the tube 3 and the body member 5 of the thermocouple assembly 4.

What I claim as new and desire to secure by Letters Patent of the United States is:

1. Apparatus for sensing the temperature of molten metal in a slag covered bath partially filling an open top upright vessel of substantial depth comprising an expendable thermocouple unit of the immersion type including an elongated tube of heat-insulating material, a thermocouple assembly mounted in and closing one end of the tube with the thermocouple element protruding from the said tube end, an electric extension cord extending into the tube from the opposite tube end and having a pair of mutually insulated wires each electrically connected to a separate one of the thermocouple wires within the tube, said cord being adapted at its free end for electrical connection with a temperature measuring and recording apparatus, an annular closure member of heat-insulating material mounted around the cord and in the end of the tube opposite the thermocouple assembly accommodating end thereof, a conical support for said extension cord, said extension cord being wound around said support with the smaller diameter coils thereof toward its end within the tube, said thermocouple unit including also a tubular weight having a rounded end provided with a plurality of circumferentially spaced apart prongs projecting lengthwise of the weight, and means fastening the tube and the weight together with the tube extending through and beyond the bore of the weight in opposite directions and with the prongs of the weight disposed around and terminating beyond the protruding thermocouple element, the part of the tube extending between the weight and the annular closure member being of sufficient length to guide the thermocouple unit weight end foremost in its plunge in the bath.

2. An expendable immersion thermocouple unit for sensing the temperature of molten metal in a bath comprising an elongated tube of heat-insulating material, a thermocouple assembly mounted in and closing one end of the tube with the thermocouple element of the assembly protruding from the said tube end, an electric extension cord extending into the tube from the opposite tube end and having a pair of mutually insulated wires each electrically connected to a separate one of the thermocouple wires within the tube, said cord being adapted at its free end for electrical connection with a temperature measuring and recording apparatus, an annular closure member of heat-insulating material mounted around the cord and in the end of the tube opposite the thermocouple assembly accommodating end thereof, a tubular weight having a rounded end provided with a plurality of circumferentially spaced apart prongs projected lengthwise of the weight, and means fastening the tube and the weight together with the tube extending through and beyond the bore of the weight in opposite directions and with the prongs of the weight disposed around and terminating beyond the protruding thermocouple element, the part of the tube extending between the weight and the annular closure member being of sufficient length to guide the thermocouple unit weight end foremost in its plunge in the bath.

3. An expendable immersion thermocouple unit according to claim 2 wherein the thermocouple assembly includes an organic plastic tubular body member and a refractory cement body closing the bore of the said body member and supporting the thermocouple element, wherein the cement body presents an outer surface flush with the end of the insulating tube and wherein the bore of the weight terminates short of the body member.

4. An expendable immersion thermocouple unit according to claim 2 wherein the thermocouple assembly includes an organic plastic tubular body member and a refractory cement body closing the bore of the said body member and supporting the thermocouple element, wherein the cement body presents an outer surface flush with the end of the insulating tube, wherein the bore of the weight terminates short of the body member, wherein the thermocouple assembly includes also a pair of current lead wires each connected to a separate one of the thermocouple wires and to a separate one of the conductors of the cord and wherein the junctions between the lead wires and the thermocouple wires are embedded in the cement body.

5. An immersion expendable thermocouple unit for sensing the temperature of molten metal in a bath comprising an elongated tube of heat-insulation material closed at both ends, a thermocouple element protruding from one end of the tube, an electric extension cord extending from the opposite end of the tube and electrically connected within the tube to the thermocouple element, a weight affixed to and extending around the tube adjacent the end of the tube carrying the thermocouple element, said weight having prongs extending lengthwise of the tube and beyond the thermocouple element, the part of the tube extending between the weight and the cord accommodating end of the tube being of a sufficient length to guide the unit weight end foremost in its plunge in the bath.

References Cited

UNITED STATES PATENTS

| 2,547,875 | 4/1951 | Krasnow | 73—359 |
| 2,779,810 | 1/1957 | Horbinski | 136—221 |
| 2,864,878 | 12/1958 | Dalglish | 136—229 |
| 2,999,121 | 9/1961 | Mead. | |
| 3,277,716 | 10/1966 | Cox | 73—343 X |

FOREIGN PATENTS 681,508  3/1964  Canada.

ALLEN B. CURTIS, *Primary Examiner.*